(12) United States Patent
Held et al.

(10) Patent No.: US 7,886,695 B2
(45) Date of Patent: Feb. 15, 2011

(54) MODULAR BIRD FEEDER

(76) Inventors: William E. Held, 5437 Pointe La. East, Jupiter, FL (US) 33458; Charlotte P. Held, 5437 Pointe La. East, Jupiter, FL (US) 33458

( * ) Notice: Subject to any disclaimer, the term of this patent is extended or adjusted under 35 U.S.C. 154(b) by 339 days.

(21) Appl. No.: 12/123,971

(22) Filed: May 20, 2008

(65) Prior Publication Data

US 2009/0288607 A1 Nov. 26, 2009

(51) Int. Cl.
*A01K 61/02* (2006.01)
(52) U.S. Cl. ............... 119/52.3; 119/57.8; 119/57.9
(58) Field of Classification Search ............... 119/52.3, 119/57.8, 57.9, 52.2
See application file for complete search history.

(56) References Cited

U.S. PATENT DOCUMENTS

| | | | |
|---|---|---|---|
| 4,690,101 A | | 9/1987 | Kilham |
| 4,765,277 A | * | 8/1988 | Bailey et al. ............... 119/57.9 |
| 4,940,019 A | * | 7/1990 | Coffer ....................... 119/52.2 |
| 5,533,467 A | | 7/1996 | Lancia |
| 5,878,537 A | * | 3/1999 | Flischel ....................... 52/101 |
| 6,386,142 B1 | | 5/2002 | Holscher et al. |
| 6,662,747 B1 | * | 12/2003 | Wydra ......................... 119/63 |
| 6,792,891 B1 | * | 9/2004 | Coburn et al. ................. 119/72 |
| 7,654,225 B2 | * | 2/2010 | Madsen et al. ............. 119/52.3 |
| 2003/0019435 A1 | | 1/2003 | George |
| 2006/0102083 A1 | * | 5/2006 | Ellen et al. ................. 119/57.9 |
| 2007/0163506 A1 | | 7/2007 | Bloedorn |

* cited by examiner

*Primary Examiner*—Timothy D Collins
*Assistant Examiner*—Monica Williams
(74) *Attorney, Agent, or Firm*—McHale & Slavin, P.A.

(57) ABSTRACT

A modular bird feeder system which is particularly adapted for an individual to assemble and maintain. The system includes at least one bird feeder and means to catch bird seed located below the bird feeders. The bird feeders are mounted onto a central pole. An animal deterrent device is positioned below the bird feeders to prevent squirrels and the like from reaching the bird feeders. The animal deterrent device is also mounted onto the central pole. A ballast member is positioned below the ground and the central pole is mounted through the center of the ballast member. A stake can be secured to the lower end of the central pole and assists in securing the bird feeder system to the ground.

13 Claims, 5 Drawing Sheets

MODULAR BIRD FEEDER

FIELD OF THE INVENTION

The present invention relates to a system for providing bird feeders and perches. In particular the invention is a modular system adapted to employ a plurality of bird feeders and perches in different arrangements. The system can be readily disassembled for cleaning and adjustment of the components.

BACKGROUND OF THE INVENTION

Bird watching and feeding has been a popular hobby for quite a while. Many individuals find that bird watching is very pleasant and relaxing. Bird watching can also be very educational for an individual or for a young person. Many people try to spot as many different birds as possible. Parents and caregivers also use bird watching as a way to teach young children about nature and how different animals are similar to and different from humans. There are many varied bird watching organizations and publications. These organizations and publications provide an individual with information regarding the feeding habits of many different birds. They also offer many different bird feeders depending on the variety of bird. Bird feeders are also readily available in pet and hardware stores. These bird feeders are normally designed for a single species of bird and must be hung from a pole or tree branch or mounted on some form of support. The mounting can be a simple wire or rope to hang the bird feeder or it can be a complicated bracket assembly to secure the feeder to a particular support.

Bird feeders pose a problem of attracting other unwanted animals such as squirrels. There currently exist many different squirrel and animal deterrent devices. Some of these devices are relatively simple while others are relatively complicated. However, very few of these devices are effective in keeping the squirrels and other animals from reaching the bird seed.

PRIOR ART

U.S. Pat. No. 6,386,142 issued to Holscher et al., discloses a modular pole system for birding which includes different modules to allow a birder to custom design their birding pole to include a variety of birding accessories such as bird feeders, bird houses, artificial and natural perches and bird baths. The modular pole system includes an auger or stake to secure the pole to the ground; a stabilizer including a plurality of arms which distribute the force from the wind over a wider area; a squirrel deterrent; a dish which can hold bird seed; a branch; and a plurality of poles. Other items can be secured to the pole as further illustrated in the patent. However, none of the bird seed trays include weep holes to permit water to drain away from the tray and there is no suggestion of mounting a plurality of bird feeders vertically above each other.

U.S. Pat. No. 5,533,467 issued to Lancia, discloses a bird feeding station which is formed principally from commercially available PVC plumbing fittings and pipe. The station may be supported from a patio block or the like because of the overall light weight of the station. The system is modular, being able to accommodate a variety of feeder arrangements as well as seed dispensing arrangements. This modular construction also provides for configurations which are bird species specific due to a specific configuration. The stations are easily cleaned by the user inasmuch as they inherently incorporate somewhat straight-through passageways providing the functions of seed reservoir and seed dispensing. While a plurality of individual bird feeders can be supported from a single pole there is no teaching that the feeders can be vertically stacked above each other.

U.S. Pat. No. 4,690,101 issued to Kilham, discloses a bird feeder including a vertically disposed hollow housing having a peripheral side wall, a removable top cover and a bottom wall and at least one aperture in the side wall, a combination baffle, seed tray and perch device adapted for mounting on the outside of the side wall and including a collar adapted for slidable engagement with the side wall. The relationship of the device vis-a-vis the housing can be fixed in such a manner that the collar may at least partially obstruct the aperture so as to regulate the flow of seed therethrough. The device is preferably formed as an integral unit and includes a tray portion radially outwardly extending from the collar and terminating in an upstanding rim further provided with a plurality of radially extending circumferentially spaced perches. A plurality of trays can be stacked vertically above each other. The tray 26 is provided with a plurality of drain openings or weep holes. These are used to remove rain water from the tray.

U.S. Published Patent Application No. 2003/0019435 filed by George, discloses a bird feeder which includes a vessel for holding seeds. A removable access tunnel external to the vessel is coupled thereto at a seed opening in the vessel. The access tunnel, as well as a bar across a bottom portion of the access tunnel opening restricts access to seeds by other than birds. A removable seed cover for the opening held on by the access tunnel is made of a flexible material and includes a seed opening sized and shaped to restrict a number of seeds extractable on an attempt to remove the seeds.

U.S. Published Patent Application No. 2007/0163506 filed by Bloedorn, discloses a bird feeder including a pivotal wire bail to allow the top cap to be lifted and rotated away from the top opening for easy filling of bird food without unnecessary spillage. The bird feeder additionally includes a detachable base cap having a spring clip retention feature that holds the base cap in place when in use but provides for its intentional removal when desired for cleaning purposes. The feeder has an optional detachable tray where birds can rest while feeding. The feeder also provides multiple embodiments, having a body constructed of metal or plastic alternatives. The metal bodies, preferably tubular in shape, are each formed of perforated or expanded metal, having holes therethrough, the size of the holes being dependent upon the size of the seed or other feed selected. The plastic tube feeder provides feeder ports for seed access, as well as rotatable perches for the birds to rest on while feeding.

Thus what is lacking in the art is a modular bird feeder which can be readily assembled into a plurality of different configurations and is relatively inexpensive to manufacture.

SUMMARY OF THE INVENTION

A modular bird feeder system which is particularly adapted for an individual to assemble and maintain. The system includes at least one bird feeder and means to catch bird seed located below the bird feeders. The bird feeders are mounted onto a central pole. An animal deterrent device is positioned below the bird feeders to prevent squirrels and the like from reaching the bird feeders. The animal deterrent device is also mounted onto the central pole. A ballast member is positioned below the ground and the central pole is mounted through the center of the ballast member. A stake can be secured to the lower end of the central pole and assists in securing the bird feeder system to the ground.

Accordingly, it is an objective of the instant invention to provide a modular bird feeder system which is can be readily disassembled for cleaning and readily reassembled for use.

It is a further objective of the instant invention to provide a bird feeder system which includes bird feeders which can be readily be refilled and easily cleaned.

It is a still further objective of the instant invention to provide a bird feeder system with an aerodynamic shape and design to avoid undue stress from high wind loads and a pleasant aesthetic appearance.

It is yet another objective of the instant invention to provide a bird feeder system which includes a plurality of alternate bird feeders which enable an individual to offer a variety of bird foods to birds in a quantity that avoids the need for daily replenishment of the food.

It is a still farther objective of the instant invention to provide a bird feeder system comprising elements which can be readily disassembled for cleaning and readily reassembled for use.

It is still a further objective of the instant invention to provide a bird feeder system which includes a built in water feature which provides fresh drinking water for birds and other wildlife.

It is still yet another feature of the instant invention to provide a bird feeder system which includes a water barrier that prevents ants and other insects from ascending the bird feeder and contaminating the bird food.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Figures 1, 2, 3:
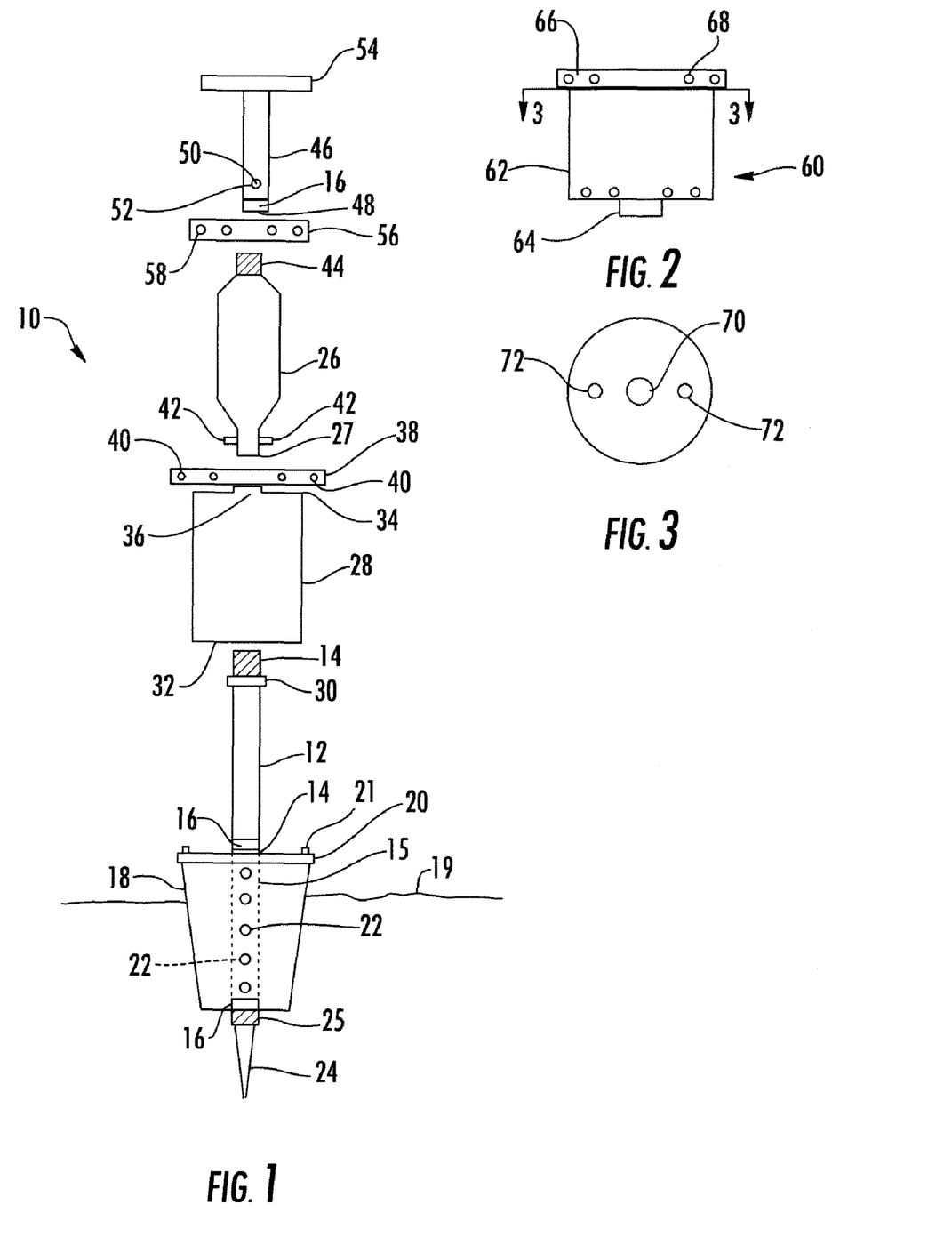
FIG. 1 is an exploded view of a preferred embodiment of the bird feeder system.
FIG. 2 is a side view of an alternate embodiment of a first bird feeder.
FIG. 3 is a top view of the alternate embodiment of a first bird feeder taken along line 3-3 in FIG. 2.

Similar reference numerals are used to identify similar elements throughout the specification. Preferably all of the components of the bird feeder system are plastic. However, any other materials could also be used to manufacture the bird feeder system. A bird feeder system 10 is illustrated in FIGS. 1-15. A first embodiment of the bird feeder system is illustrated in FIGS. 1-3. The bird feeder system includes a first central pole segment or support member 12. The first central pole segment preferably includes externally threaded portions 14 on both ends thereof. A second central pole segment 15 is connected to the first central pole segment utilizing a coupling 16. The second pole segment is provided with a threaded portion at the top end thereof (not shown). The coupling element 16 is threaded to accept the threaded ends of first and second pole segments and secure these elements together. A coupling element can also be provided at the top of the first pole segment.

Figure 4:
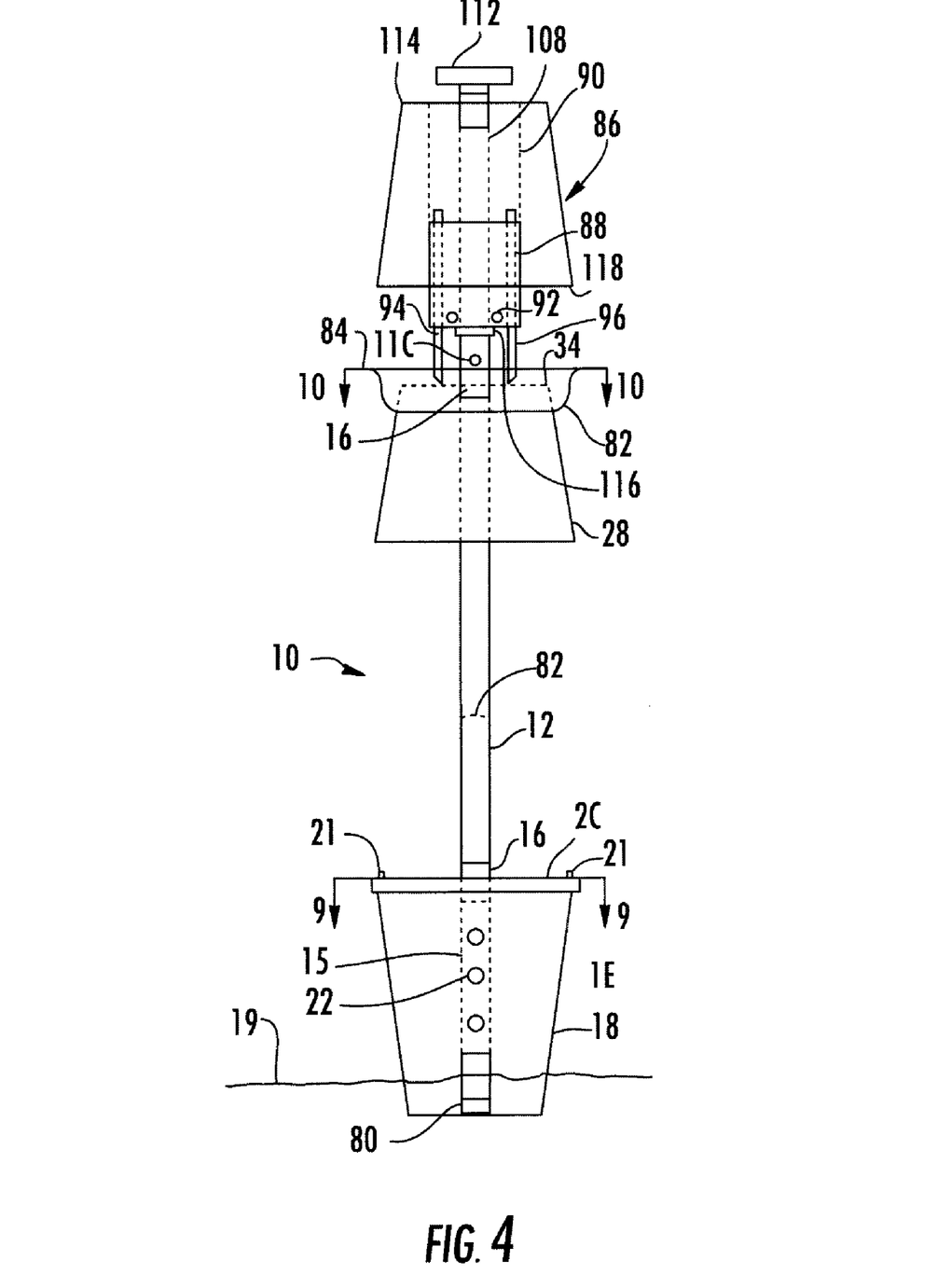
FIG. 4 is an exploded view of a second embodiment of the bird feeder system.
Figure 9:
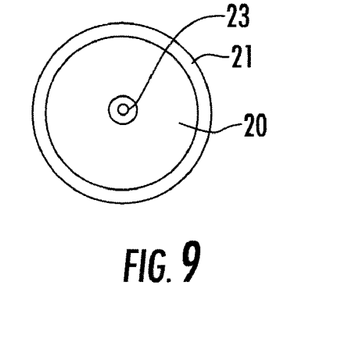
FIG. 9 is a view taken along line 9-9 in FIG. 4.
Figure 10:
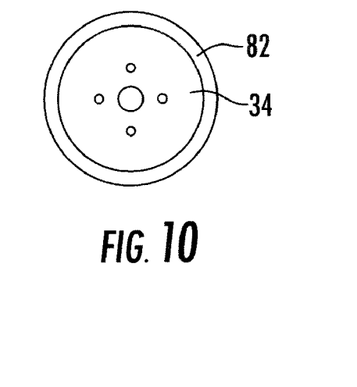
FIG. 10 is a view taken along line 10-10 in FIG. 4.
Figure 11:
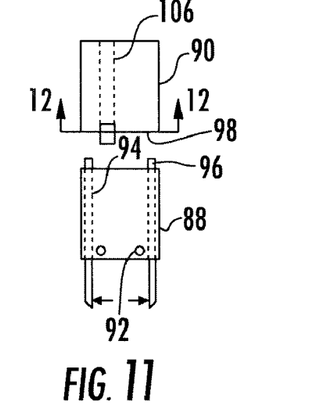
FIG. 11 is an exploded view of the two containers of a second bird feeder.

In a preferred embodiment a ballast or stabilization member 18 is partially buried in the ground 19. The ballast or stabilization member 18 is preferably substantially cylindrical and contains ballast. In one embodiment it can be a five gallon plastic bucket. The ballast may be a solid material, such as sand or dirt, or it may be a liquid, such as water or a mixture of both. In a preferred embodiment the member 18 is hollow and fluid tight. When the bird feeder is initially assembled a hole is dug in the ground 19 and the ballast member 18 is placed therein. Ballast is the added to member 18. A lid 20 can be secured to the top end of member 18. The lid 20 preferably includes an upstanding rim 21 which extends around the upper periphery of the lid 20, as illustrated in FIGS. 1, 4 and 9. The rim 21 provides a dam or barrier which enables water or other fluids to be retained on top of lid 20. This pool of water forms a barrier which prevents ants and other insects from crawling up the sides of stabilization member 18, across lid 21 and up first pole segment 12 to the bird seed feeders. The second central pole segment 15 can be provided with a plurality of apertures 22 along the length thereof. The apertures 22 are used to introduce water or other fluids into member 18. Water or other fluids are introduced into the top of the second pole segment 15. The water flows through apertures 22 and into member 18, thus filling member with water which serves as the ballast. The ballast can be supplied to member 18 prior to or subsequent to the installation of lid 20. The water or other fluids provide ballast for the lower end of the bird feeder system and helps to stabilize the bird feeder system. In place of water ballast sand, dirt or other solids can be placed within member 18. The ballast also provides stability to the system when there are high winds due to its aerodynamic design and cylindrical shape. Since the ballast member is preferably made from plastic or a similar material, it will not rot or corrode when set into the ground. A stake 24 can also be secured to a lower end of pole segment 15. A threaded member 25 is secured to the top of stake 24. The member 26 can be threaded onto a coupling 16 on the lower end of second pole segment 15 or directly to pole segment 15. Other means can also be employed to secure stake 24 to pole segment 15. The stake 24 is designed to be inserted into the ground and provide both support and stability for the bird feeder system. In place of stake 24 other ground securing means can be placed into the ground and the pole segment 15 secured to these ground securing means.

A first bird feeder 26 is secured to the upper end of first central pole segment 12. The first bird feeder is preferable provided with threads 27 internally at a lower end. The threads 27 engage the threads 14 of the top portion of the pole segment 12 to secure the members together. In place of the threaded connection a coupling 16 or other securing means can be employed to secure the pole segment 12 and the first bird feeder 26 together. An animal deterrent device or hollow member 28 is placed over the pole segment 12. The animal deterrent device 28 is includes an open bottom 32 and a closed top 34. The closed top includes an aperture 36 through which pole segment 12 passes. A ring or washer 30 is secured to the pole segment 12 adjacent the threaded end. When the first bird feeder 26 is secured to the pole segment 12 the top of the animal deterrent device 28 is captured and secured in between the ring 30 and the first bird feeder 26. The open bottom preferable does not have a lip or any other structure around the perimeter of the rim. This type of construction does not offer a surface for a squirrel of other animal to grab onto and climb onto the bird feeder system. The animal deterrent device is a cylindrical bucket in a preferred embodiment. In place of the bucket 24 any other type or shape of device can be employed. The animal deterrent device only requires an open bottom portion, a closed top portion and sides between the bottom and top portions.

A first tray 38 is secured above the animal deterrent device 28 and below the first bird feeder 26. A lower end of the first bird feeder preferably includes a threaded connection 27. The threaded connection 27 of the first bird feeder is constructed and arranged to engage threaded end 14 of the pole segment and secure the pole segment and first bird feeder together. Since the animal deterrent device 28 and first tray 38 are positioned in between the pole segment and first bird feeder, these elements are secured together by the connection of the pole segment to the first bird feeder. First tray 38 is preferably provided with a plurality of weep holes 40. The weep holes 40 allow water which accumulates in the tray to drain therefrom without allowing bird seeds to pass therethrough. The water accumulates in the tray as a result of rain, dew or someone watering the lawn. While a tray with weep holes is disclosed, a tray without weep holes can also be employed.

The first bird feeder 26 includes a plurality of feeding tubes or apertures 42 around a bottom portion of the feeder. The apertures 42 are designed and sized to allow birds to remove bird seeds or feed from the bird feeder without the remaining seeds or feed falling out of the feeder due to gravity. The apertures 42 can also be in the form of a trough to provide easier access for the birds to the seed or feed. The birds or other wildlife will perch on the tray 38 or top 34 of the ballast member and consume the bird feed or seed from the first bird feeder. An upper portion of the first bird feeder 26 is preferably provided with threads 44. The first bird feeder can be formed from a transparent or semi-transparent material so that the level of bird seed or feed in the feeder can be observed.

A second bird feeder 46 is secured to the top portion of the first bird feeder. The lower end of the second bird feeder 46 is provided with internal threads 48 or a coupler 16. The threads 48 engage the threads 44 of the first bird feeder to secure the first and second bird feeders together. The second bird feeder 46 further includes a plurality of apertures 50 along a lower portion of the bird feeder. The apertures 50 are designed to allow birds to remove bird seeds or feed from the bird feeder without the remaining seeds or feed falling out of the feeder due to gravity. A plurality of perches 52 can be secured to the second bird feeder adjacent the apertures 50. The perches 52 allow birds to rest thereon while consuming seed or feed from the second bird feeder. A removable top 54 encloses the upper end of the second bird feeder. This top is designed to keep rain, snow and other weather elements away from the bird seed in the bird feeders. When the bird seed or feed needs to be replaced in the second bird feeder the top 54 is removed, the seed or feed is poured into the feeder and the top is then replaced. The second bird feeder can be formed from a transparent or semi-transparent material so that the level of bird seed or feed in the feeder can be observed.

A second tray 56 is positioned in between the first and second bird feeders. The threaded connections 44 and 48 of the first and second bird feeders respectively help to secure the second tray 56 in its position. The coupling element 16 can also be employed to connect the first and second bird feeders together. The second tray 56 is also preferably provided with weep holes 58. The weep holes 58 allow water which accumulates in the tray to drain therefrom without allowing bird seeds to pass therethrough. The water accumulates in the tray as a result of rain, dew or someone watering the lawn. Tray 56 is designed to keep rain, snow and other weather elements away from the bird seed in the bird feeders. While weep holes in the tray are discloses a tray without weep holes can also be employed.

A second embodiment of the first bird feeder 26 is illustrated as 60 in FIG. 2. The second embodiment 60 of the first bird feeder includes a substantially cylindrical main body 62. The main body 62 is preferably the same diameter throughout its height. A connection member 64 is secured to a lower portion of the bird feeder 60. The connection member is preferably provided with threads to engage the threads 14 on the top end of pole segment 12. This engagement secures bird feeder 60 and pole segment 12 together. In addition to threads other securing means can be employed to secure the bird feeder to the pole segment. A tray 66 is preferably integrally formed on a top end of bird feeder 60. The tray 66 can also be formed as a separate member. The tray 66 is preferably provided with weep holes 68. The weep holes 68 allow water and other liquids which accumulate in the tray to drain therefrom without allowing bird seeds to pass therethrough. The water accumulates in the tray as a result of rain, dew or someone watering the lawn. While weep holes in the tray are discloses a tray without weep holes can also be employed.

The top end of the bird feeder 60 is illustrated in FIG. 3. The top end includes a connector 70 by which the second bird feeder is secured to the first bird feeder. Apertures 72 permit the first bird feeder to be refilled with bird seed or feed without removing the bird feeder from the bird feeder system.

Figure 5:
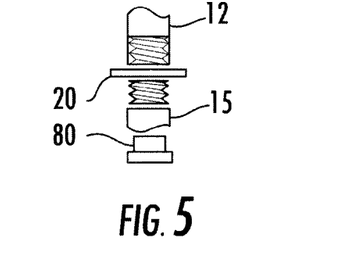
FIG. 5 is an exploded view of a connection between a first and a second tubular member.

A second embodiment of the bird feeder system 10 is illustrated in FIGS. 4-15. This second embodiment also includes a first central pole segment or support member 12. The first pole segment 12 preferably includes threaded portions 14 or connectors 16 on both ends thereof. The lower end of first pole segment is secured to a second central pole segment 15. Couplers 16 can be employed to secure the two threaded ends of the pole segments together. In addition, one of the pole segments can be provided with internal threads and these would engage an externally threaded end of the other pole segment. In this second embodiment a second pole segment 15 is secured to the lower end of the first pole segment 12. The second pole segment can be provided with a threaded portion at the top end thereof as illustrated in FIG. 5.

Figure 6:
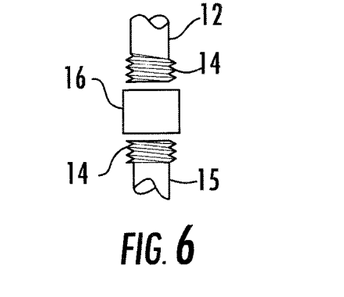
FIG. 6 is an exploded view of the connection between two tubular members employing a coupling element.

The lower end of the first pole segment 12 includes an internally threaded portion, as illustrated in FIG. 5. The second pole segment is threaded into the first pole segment with the lid 20 of the ballast member therebetween. This type of connection can also be utilized to connect the first pole segment 12 to the first bird feeder 26. This type of connection is preferred because it prevents water and other fluids from flowing downwardly and into the threads of a threaded connection. The water is prevented from entering a threaded connection as a result of the upper pole being threaded on the interior thus completely sealing the threads from the outside and the water and other fluids. In addition it can be utilized to connect the second bird feeder 46 to the first bird feeder 26 in the first embodiment of the bird feeder system disclosed in FIGS. 1-3. An alternate connection between the first and second pole segments; the first bird feeder and the pole segment and the first and second bird feeders is illustrated in FIG. 6. A connector 16 includes internal threads. First pole segment 12 (or first bird feeder 26 or second bird feeder 46) includes external threads 14 on an end portion. These threads engage the coupling 16. Second pole segment 15 (or first bird feeder or the top of the first pole segment) includes external threads 14 on an end portion. These threads also engage the coupling 16.

Figure 7:
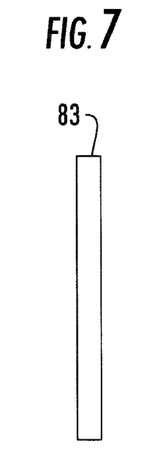
FIG. 7 is a front view of a reinforcing pole which can be used inside of the bird feeder for support.
Figure 8:
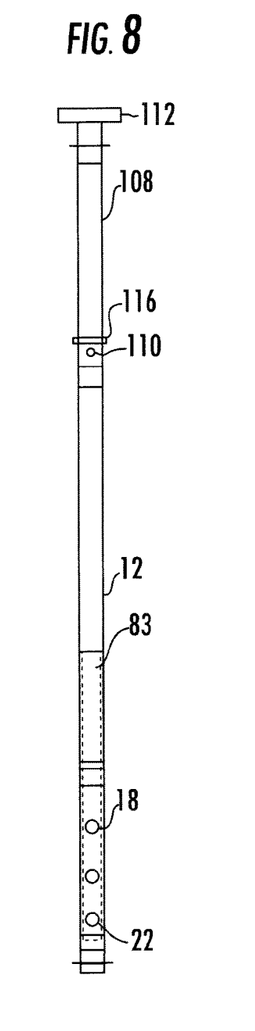
FIG. 8 is a view of the support structure of a second embodiment of the bird feeder system.

In this second embodiment a third pole segment 83, FIGS. 4, 7 and 8 can be inserted into the interior of pole segments 12 and 15. Said third pole segment is preferably constructed of metal. Since the pole segments 12 and 15 are preferably plastic, the metal pole adds structural rigidity to the system. In place of a metal pole, a pole constructed of any other material that is stronger than plastic could be employed. A ballast or stabilization member 18 is secured around pole segment 15. The ballast member 18 is the same as ballast member 18 in the first embodiment of the system. Member 18 can be inserted into the ground or placed at ground level, as illustrated in FIG. 4. The member 18 is preferably a plastic bucket and contains ballast. Any other shaped member could be used for ballast member 18 as long as it is capable of holding ballast. The ballast may be in the form of a solid material or is may be a liquid, as previously disclosed. The ballast member 18 includes a lid 20 which preferably includes an upstanding rim 21 which extends around the upper periphery of the lid 20, as illustrated in FIG. 7. An aperture in the lid 20 permits the insertion of second pole segment 15 into member 18. When the second pole segment 15 has apertures therein, water and other fluids can be introduced into the ballast member 18 through pole segment 15. The water or other fluids provide ballast for the lower end of the bird feeder system and helps to stabilize the system. When the ballast member 18 becomes filled with water, the water will exit through the aperture 23 in the lid and pool on top of lid 20 to form a barrier to prevent ants or other insects from reaching pole segment 12 and climbing up to the bird feeder. The water on the top of the lid can also act as a supply of drinking water for the birds and other animals. The ballast can also provide stability to the system when there are high winds. A stake can also be secured to the lower portion of the second pole segment, as illustrated in FIG. 1. In place of the stake 24 of the first embodiment, a plug 80 can be secured to the lower end of the second pole segment, as illustrated in FIGS. 4 and 5. The ballast member 18 can then be placed above the ground 19 or on any other support as illustrated in FIG. 4.

An animal deterrent device 28 is secured to the upper end of first pole segment 12, as illustrated in FIG. 4. The animal deterrent device is tapered or conically shaper from the top towards the bottom and includes a top 34 which serves as a perch for birds. A removable ring or flange 82 slips over the top 34 of the animal deterrent device and engages the sides of the deterrent device. The ring or flange 82 is held in place by friction, although other means could be employed the hold it in place. The ring or flange serves to catch the bird seed or feed which falls off the top 34 of the animal deterrent device. The top portion 84 of the ring is at a greater elevation than the top 34 of the deterrent device. This serves to deflect the wind and rain away from the top 34 of the deterrent device. When the ring or flange becomes filled with seed or feed it is pulled upwardly in a rapid motion and the seed therein is moved to the top 34. The ring or flange 82 is then replaced onto the deterrent device 28. The lower peripheral rim of the animal deterrent device is preferably a smooth surface without any projections. These undesirable projections would offer a surface for a squirrel or other animal to grab a hold of a climb to the bird feeder system and are avoided.

Figure 12:
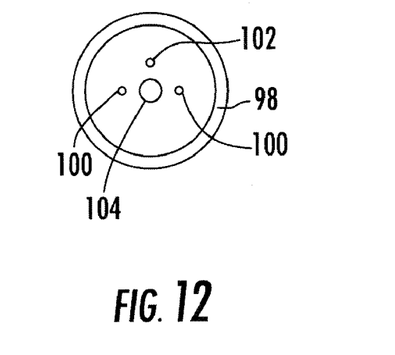
FIG. 12 is a view taken along line 12-12 in FIG. 11.
Figure 13:
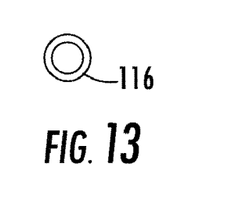
FIG. 13 is a top view of the ring in FIGS. 4, 8 and 14.
Figure 14:
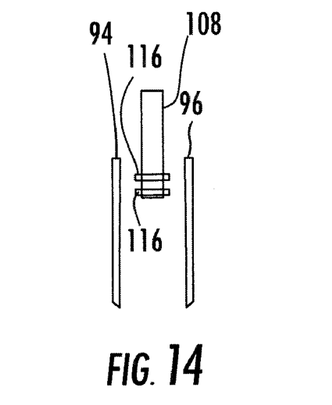
FIG. 14 is a view of the feed tubes of two different bird feeders illustrated in FIG. 4.
Figure 15:
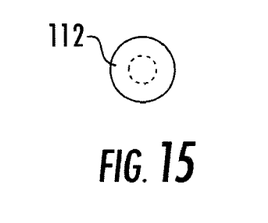
FIG. 15 is a top view of the lid in FIGS. 4 and 8.

A bird feeder 86 is secured to the upper end of pole segment 12 utilizing one of the connections described in FIG. 5 or 6. The bird feeder 86 comprises two containers 88 and 90, illustrated in FIGS. 4 and 11. These containers 88 and 90 can be one gallon cans, other containers similar in size to the cans or any other size containers, including recycled containers. The containers 88 and 90 are preferably identical in size. However, they could be other sizes also. Containers 88 and 90 are preferably cylindrical, however they could be any other shape. The first container 88 has an open top and a closed bottom. A plurality of apertures 92 are circumferentially spaced around a lower side portion of container 88. The apertures 92 are designed to allow birds to remove bird seeds or feed from the bird feeder without the remaining seeds or feed falling out of the feeder due to gravity. The bottom of container 88 includes apertures through which a first feed tube 94 and a second feed tube 96 extend. The feed tubes 94 and 96 extend downwardly from the bottom of container 90 and rest on top 34 of the animal deterrent device 28, as illustrated in FIG. 4. The lower ends of feed tubes 94 and 96 are cut or formed at an angle to allow bird seed or feed to flow from the feed tubes and onto the top 34, which serves as a feed tray for bird seed or feed. This construction allows the bird seed to be automatically replenished without requiring the attention of an individual. The tops of feed tubes 94 and 96 extend upwardly above the top of container 88. Bird seed or feed is introduced through the top of feed tubes 94 and 96. The second container 90 includes an open top and a closed bottom 98. The bottom 98 closes the lower end of container 90 and includes a plurality of apertures 100, 102 and 104 therethrough, as illustrated in FIG. 12. The top of container 90 can be a removable lid or it can be open with a means to secure a feed tube 106 in place relative to the container 90. The bottom 98 includes apertures 100 for feed tubes 94 and 96, an aperture 102 for feed tube 106 and an aperture 104 for a feed tube 108.

Three different bird seeds or feeds can be offered to the birds or other wildlife using this second embodiment. A first type of bird feed or seed is dispensed through feed tubes 94 and 96. A second different type of bird seed or feed is dispensed through feed tube 106 and apertures 92. A third different type of bird seed or feed is dispensed through feed tube 108. The first and second feed tubes 94 and 96 extend upwardly through the bottom of container 90 for a short distance. A first type of bird seed or feed is supplied into container 90 and from which it flows into and through feed tubes 94 and 96. This first type of bird seed is eventually distributed onto top 34 of the animal deterrent device 28. A second type of bird seed or feed in introduced into feed tube 106 and from which it flows into container 88. The second type of bird seed is distributed through the apertures 92 in the first container. A third type of bird seed or feed is introduced into feed tube the top of feed tube 108 and from which it flows downwardly to the bottom of feed tube 106. This third type of bird seed or feed is distributed through apertures 110 at the lower portion of feed tube 108. The apertures or openings 92 and 110 are sized such that a bird can remove the bird seed therefrom but the seed will not be dispensed by gravity alone.

An advantage of this plural container system is that the supply of first bird seed or feed can be replenished without disturbing the supply of the second and third bird seeds. Also the supply of the second bird seed can be replenished by supplying the second bird seed to the feed tube 106 and thus filling the first container 88 with the second bird seed. This does not disturb the supply of the first and third bird seeds. Finally, the supply of the third bird seed can be replenished by removing lid 112 from the top of feed tube 108. A third type of bird seed or feed is then placed into feed tube 108 and the lid is replaced. This does not disturb the first and second supply of bird seed.

The first container 88 includes and aperture through which feed tube 108 passes. A plurality of rings or washers 116, placed above and below the bottom of container 88 help to secure the container 88 to the bird feeder system and space the first container an appropriate distance above the top 34. This distance permits birds and other wildlife to alight on top 34 and feed on the bird seed. The rings 116 are preferably made from a resilient material which frictionally adheres to feeder tube 108, although other types of materials could be used. Also other means could be employed to secure the first container 88 to the feed tube 108.

A protection member or deflector 114 is attached to an upper portion of feed tube 108. The deflector 114 also sits atop the second container 90, as illustrated in FIG. 4. The deflector prevents rain and other unwanted substances from contacting the bird seed or feed which has been dispensed onto top 34 of the animal deterrent device. The deflector alto prevents rain, snow and other weather reaching apertures 92 and 110. Thus all the bird seed or feed is kept dry. The deflector 114 is preferably a five gallon plastic bucket, although other containers of various shapes and constructed from different materials could also be employed. The outer rim 118 of the bottom of deflector 114 is sized so that water which drips off it will not fall onto the bird seed on top 34 or within ring 82. The deflector is sized and shaped to permit air to circulate within the deflector. This air circulation helps to keep the birds cool and prevents water condensation within the deflector. The defector 114 also offers shade for the birds and wildlife.

The central support member or pole is illustrated in FIG. 8 with the bird feeders, ballast member, animal deterrent device and deflector removed. Preferably this pole or support member is made from plastic or a similar material to prevent lightening strikes, rot and corrosion. Other materials could also be employed provided they have the strength and stability to support the bird feeders, ballast members, animal deterrent device and deflector.

Figure 16:
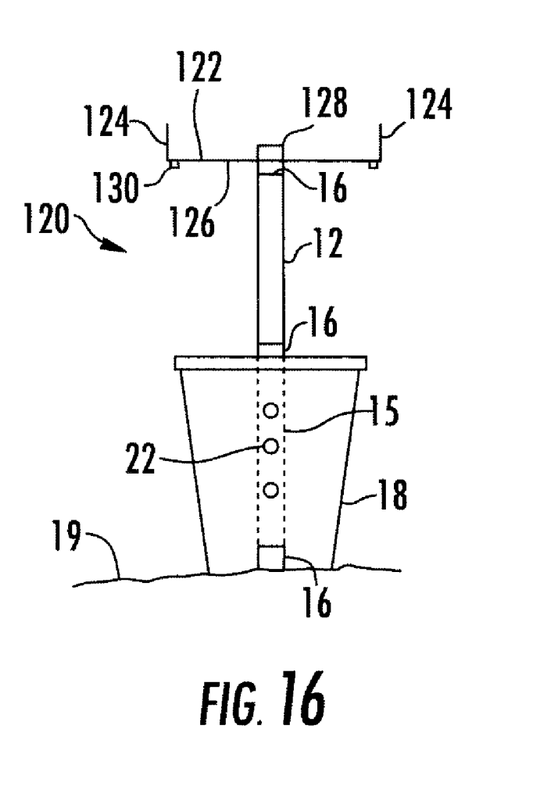
FIG. 16 is a side view of a birdbath embodiment of the present invention.
Figure 17:
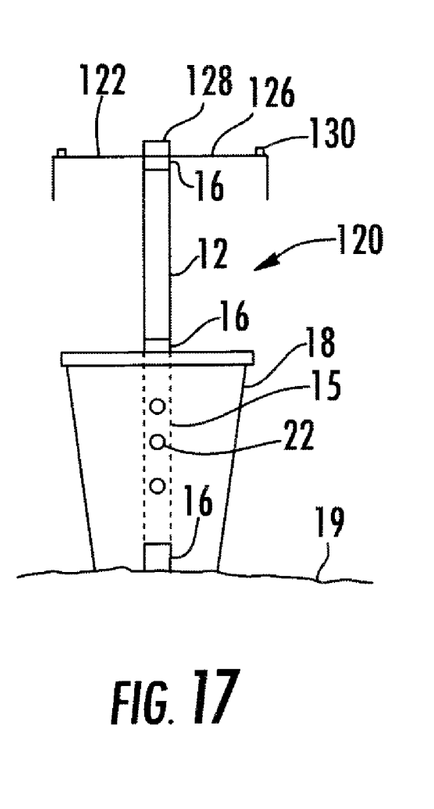
FIG. 17 is a side view of the birdbath of FIG. 16 employed as a feed tray.

Another embodiment of the present invention is illustrated in FIGS. 16 and 17. This embodiment is directed towards a combined bird bath and bird feeder 120. A first pole segment 12 is connected to a second pole segment 15 by either of the connection means described in FIG. 5 or 6. The second pole segment 15 is provided with apertures 22 for the introduction of water or other fluids into ballast member 18. Ballast member 18 can be filled with fluids, dirt, sand or other solids as described above in the first and second embodiments of the present invention. A lid 20 closes the top of ballast member 18. The lid functions in the same manner as the lid 20 described in the first and second embodiments of the present invention. Coupling 16 can be provided at either, both or neither ends of the second pole segment 15. A coupling 16 is provided at the top of the first pole segment 12. Coupling 16 enables a birdbath or feed tray 122 to be secured to the top of pole segment 12. In FIG. 16 element 122 serves as a birdbath. The upstanding sides 124 are sealed onto a base 126 to enable water or fluid to be retained within the birdbath. The sides 124 could be a rim that is molded to the base 216. The preferred shape of base 126 is circular but any other shape could also be employed. A connecting element 128 is secured to coupling 16 through an aperture in base 126. Other types of connecting means could also be employed. Connecting element 128 is constructed and arranged to serve as a support or island for birds and other wildlife to alight on when using the bird bath.

When the birdbath 126 is inverted, as illustrated in FIG. 17, it can serve as a feed tray for birds and wildlife. Bird seed or feed can be placed on the top of the inverted birdbath 126. The bird seed is retained thereon by a rim or sidewalls 130. Connecting element 128 can serve as a perch for birds feeding in this embodiment.

While the components of the bird feeder system are preferably made from plastic material any other material could be used to manufacture these components, including recycled materials.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A bird feeder system comprising:
a first pole segment;
a second pole segment;

a ballast member surrounding said second pole segment;

a first bird feeder secured to an upper end of said first pole segment, said first bird feeder constructed and arranged to separately hold and distribute at least two different bird feeds;

said first pole segment being releasably secured to said first pole segment; and an animal deterrent device secured in between said first pole segment and said first bird feeder, wherein said first bird feeder includes two substantially similar containers, a first container and a second container located above said first container, first feed tubes mounted in said first container and being constructed and arranged to convey bird feed from said second container through said first container and deposit said bird feed on a surface below said first container.

2. The bird feeder system of claim 1 including a first ring releasably secured to an outer portion of an upper portion of said animal deterrent device, said first ring including a lower end having substantially the same shape as the portion of the animal deterrent device which it surrounds and an upper end which is larger in diameter than the lower end, said upper end of said first ring extends vertically above the top of said animal deterrent device.

3. The bird feeder system of claim 2 wherein said animal deterrent device is cylindrical, has an open bottom end and a closed top end.

4. The bird feeder system of claim 1 including apertures in said bottom portion of said first container, said apertures being constructed and arranged to dispense bird feed from said first container when a bird removes said bird feed but does not dispense said bird feed by gravity alone.

5. The bird feeder system of claim 1 including a second feed tube in said second container, said second feed tube being constructed and arranged to convey bird feed from above said second container to the interior of said first container.

6. The bird feeder system of claim 5 including a third feed tube, said third feed tube extending from above said second container to below said first container and through both said first and second containers, said third feed tube being constructed and arranged to be filled from a top portion, retain bird feed therein and dispense bird feed from at least one aperture located below the bottom of said first container.

7. The bird feeder system of claim 6 wherein said at least one aperture in said third feed tube is constructed and arranged to dispense said bird feed when a bird removes said bird feed but does not dispense said birds feed by gravity alone.

8. The bird feeder system of claim 6 wherein said third feed tube is releasably connected to an upper end of said first pole segment.

9. The bird feeder system of claim 1 including a deflector mounted on top of said second container and extending downwardly toward a bottom of said first container, said deflector being constructed and arranged to prevent rain and other weather elements from reaching the bird feed in said first bird feeder.

10. The bird feeder system of claim 1 wherein said ballast member includes a lid closing a top portion, said lid including an upstanding rim circumferentially enclosing said lid, said rim constructed and arranged to retain fluid on said lid whenever fluid is placed onto said lid.

11. The bird feeder system of claim 1 wherein said second pole segment includes a plurality of apertures, said apertures being constructed and arranged to distribute a fluid introduced into said second pole segment into said ballast member.

12. The bird feeder system of claim 1 including a device securing said bird feeder system to the ground.

13. The bird feeder system of claim 1 including a third pole segment, said third pole segment formed of a material which is structurally stronger than the material of both said first and said second pole segments, said third pole segment positioned within the interior of said first and said second pole segments, said third pole segment extending from a bottom of said second pole segment into said first pole segment, whereby said third pole segment adds structural reinforcement to said first and said second pole segments.

* * * * *